United States Patent
Pilu et al.

(10) Patent No.: US 7,139,445 B2
(45) Date of Patent: Nov. 21, 2006

(54) IMAGE CAPTURE DEVICE AND METHOD OF SELECTING AND CAPTURING A DESIRED PORTION OF TEXT

(75) Inventors: Maurizio Pilu, Bristol (GB); Guy de Warrenne Bruce Adams, Stroud (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 688 days.

(21) Appl. No.: 10/313,012

(22) Filed: Dec. 6, 2002

(65) Prior Publication Data

US 2003/0128875 A1    Jul. 10, 2003

(30) Foreign Application Priority Data

Dec. 6, 2001    (GB) .................................. 0129160.8

(51) Int. Cl.
*G06K 9/22*    (2006.01)
(52) U.S. Cl. ............... 382/313; 382/282; 382/317; 382/321; 358/505; 358/453; 358/538
(58) Field of Classification Search ............... 382/187, 382/188, 190, 313, 321, 282, 317, 453; 358/473, 358/474, 505, 538
See application file for complete search history.

(56) References Cited

U.S. PATENT DOCUMENTS

| | | | | |
|---|---|---|---|---|
| 5,381,020 A | * | 1/1995 | Kochis et al. | ............... 250/566 |
| 5,511,148 A | * | 4/1996 | Wellner | ....................... 358/1.6 |
| 5,586,212 A | * | 12/1996 | McConica et al. | .......... 385/146 |
| 5,652,412 A | * | 7/1997 | Lazzouni et al. | ......... 178/18.01 |
| 5,774,602 A | * | 6/1998 | Taguchi et al. | ............. 382/314 |
| 5,923,017 A | * | 7/1999 | Bjorner et al. | ............... 235/385 |
| 6,119,944 A | * | 9/2000 | Mulla et al. | ........... 235/472.03 |
| 6,158,662 A | * | 12/2000 | Kahn et al. | ............ 235/472.01 |
| 6,178,297 B1 | | 1/2001 | Ting | |
| 6,427,917 B1 | * | 8/2002 | Knowles et al. | ........ 235/462.44 |
| 6,540,145 B1 | * | 4/2003 | Gurevich et al. | ....... 235/462.21 |
| 6,715,686 B1 | * | 4/2004 | Fahraeus | ................ 235/462.45 |

FOREIGN PATENT DOCUMENTS

| | | |
|---|---|---|
| EP | 1 022 608 A1 | 7/2000 |
| EP | 1 128 655 A1 | 8/2001 |
| GB | 2 257 800 A | 1/1993 |
| GB | 2 359 895 A | 9/2001 |
| WO | WO 99/57678 | 11/1999 |
| WO | WO 01/01332 A1 | 1/2001 |

OTHER PUBLICATIONS

Japanese Patent Abstract, Publication No. JP57104918, Publication Date Jun. 30, 1982.
Pilu, Maurizio, *Extraction of Illusory Linear Clues in Perspectively Skewed Documents*, IEEE Computer Vision and Pattern Recognition Conference, 2001, pp. I-363-I-368.
Baird H.S., *Background Structure in Document Images*, International Journal of Pattern Recognition and Artifical Intelligence, vol. 8, No. 5 (1994), pp. 1013-1031.

(Continued)

*Primary Examiner*—Jingge Wu (57) ABSTRACT

An image capture device electronically captures and selects a desired text portion. A visible light image is projected onto text on a document to enable a user to position the light image relative to the desired text portion. At least some of the text is captured in accordance with a position of the light image. A text selector selects the desired text portion from the captured text.

28 Claims, 7 Drawing Sheets

OTHER PUBLICATIONS

Irani, M. and Peleg, S., *Improving Resolution by Image Registration, Computer Vision Graphics and Image Processing Journal*, vol. 53 (May 1991), pp. 231-239.

Japanese Patent Abstract, Publication No. JP57104918, Publication Date Jun. 30, 1982.

* cited by examiner

IMAGE CAPTURE DEVICE AND METHOD OF SELECTING AND CAPTURING A DESIRED PORTION OF TEXT

RELATED APPLICATIONS

The present application is based on, and claims priority to British Application Serial Number 0129160.8, filed Dec. 6, 2001, the disclosure of which is hereby incorporated by reference herein in its entirety.

FIELD OF THE INVENTION

The invention relates to an image capture device for capturing and selecting a desired portion of text, and to a method of selecting and capturing in electronic form a desired portion of text from a text document.

BACKGROUND OF THE INVENTION

Using a known type of camera device, for example as described in International Patent Application Publication Number WO 01/01332, text can be captured by holding a tip of the device flat in contact with a surface of a text document so that an opening of the camera covers the entire height of the text, pressing a trigger of the device and, keeping the trigger pressed, moving the device so as to scan the desired text. The trigger is released to stop scanning. To function effectively, the device must be moved in contact with the document surface.

EP-A-1022608, assigned to Hewlett-Packard Company, discloses a camera that projects a pattern of visible light onto an object to be photographed to indicate the area of the object within view of the camera. The device is for framing whole documents, and is not for indicating desired portions of text within documents.

U.S. Pat. No. 4,514,063 uses a light pattern to delimit the capture area in a copy stand. It does not have application in hand held devices for indicating desired portions of text within documents.

Bar-code scanners are known which project light primarily to enable them to sense reflected light data pertaining to the bar-code indicia. Such devices are not useful for capturing desired text constituting a portion of a text document.

An object of the invention is at least to mitigate or to overcome at least one drawback of at least one of the above-mentioned known devices.

SUMMARY OF THE INVENTION

In accordance with the invention, there is provided an image capture device for digitally capturing desired text constituting a portion of a text document, the device comprising projector apparatus operable to project a visible light image onto the document to enable a user of the device to guide the light image to a desired location in the document and thereby to position a capture field of the device relative to the desired text.

The image capture device is advantageous in that a user can scan a desired portion of text from a document without having to bring the device into, or maintain, contact with the document surface. This facilitates quicker and more convenient user operation. Furthermore, no viewing aperture or display screen is necessary for a user to align the device with the desired text.

The device can be operable so as to provide optical character recognition (OCR) of text over-passed by the light image when the light image is guided from a specified said desired location to a specified further desired location in the document. This facilitates a manual scanning operation, whereby a user can manually precisely define desired text between the two specified locations.

The device can be operable to automatically perform a best-fit operation on text over-passed by the light image so as to select text between two specified locations on a line of text disposed adjacent at least one further, mutually parallel, line of text. This enables the device to compensate for inaccuracies in the manual guiding of the light image along a line of text.

Alternatively, the device can be operable to recognise a predefined text structure disposed at or adjacent a single specified said desired location. This can facilitate a reduction in effort required by a user to capture a desired text structure and more accurate definition of the desired text.

The device can be arranged to perform recognition of a said predefined text structure struck through or outlined by the light image when the light image is guided diagonally through, or around a periphery of, a desired text structure. This facilitates use of the device in strike-through or outline scanning mode to provide a particularly convenient way of capturing a desired text structure such as, for example, a paragraph.

The device can be operable to project the light image in a form or manner indicative of a present operating mode and/or text structure recognition mode of the device. This facilitates easier user operation of the device by providing a particularly convenient way of communicating to the user, during operation, what is a present mode of the device.

In accordance with a further aspect of the invention there is provided camera apparatus for digitally capturing text, comprising:
 a) apparatus for projecting structured visible radiation to at least one specified location in a text document, for guiding a capture field of the camera apparatus; and
 b) OCR apparatus for performing OCR on text associated with said at least one specified location.

In accordance with a further aspect of the invention, there is provided a method of capturing in electronic form a desired portion of text from a text document, the method comprising:
 a) providing an image capture device having visible light image projecting apparatus and OCR apparatus;
 b) projecting a light image onto the document;
 c) guiding the projected image to at least one desired location corresponding to the desired text portion;
 d) capturing text in a region associated with the projected image; and
 e) carrying out OCR on the captured text.

The light image may be not more than about two orders of magnitude larger than the text height. This facilitates easier positioning of the light image relative to the text, thus facilitating more precise selection of a desired text portion.

The term text document as used herein refers to any optical representation at least partly in the form of text, for example a sheet of paper bearing text, a page in a magazine or journal or a business card. The term text includes any form of character or character string suitable for OCR.

DRAWINGS

In order that the invention may be well understood, an embodiment of the invention will now be described, by way of example only, with reference to the accompanying drawings, in which.

DETAILED DESCRIPTION

Figure 1:
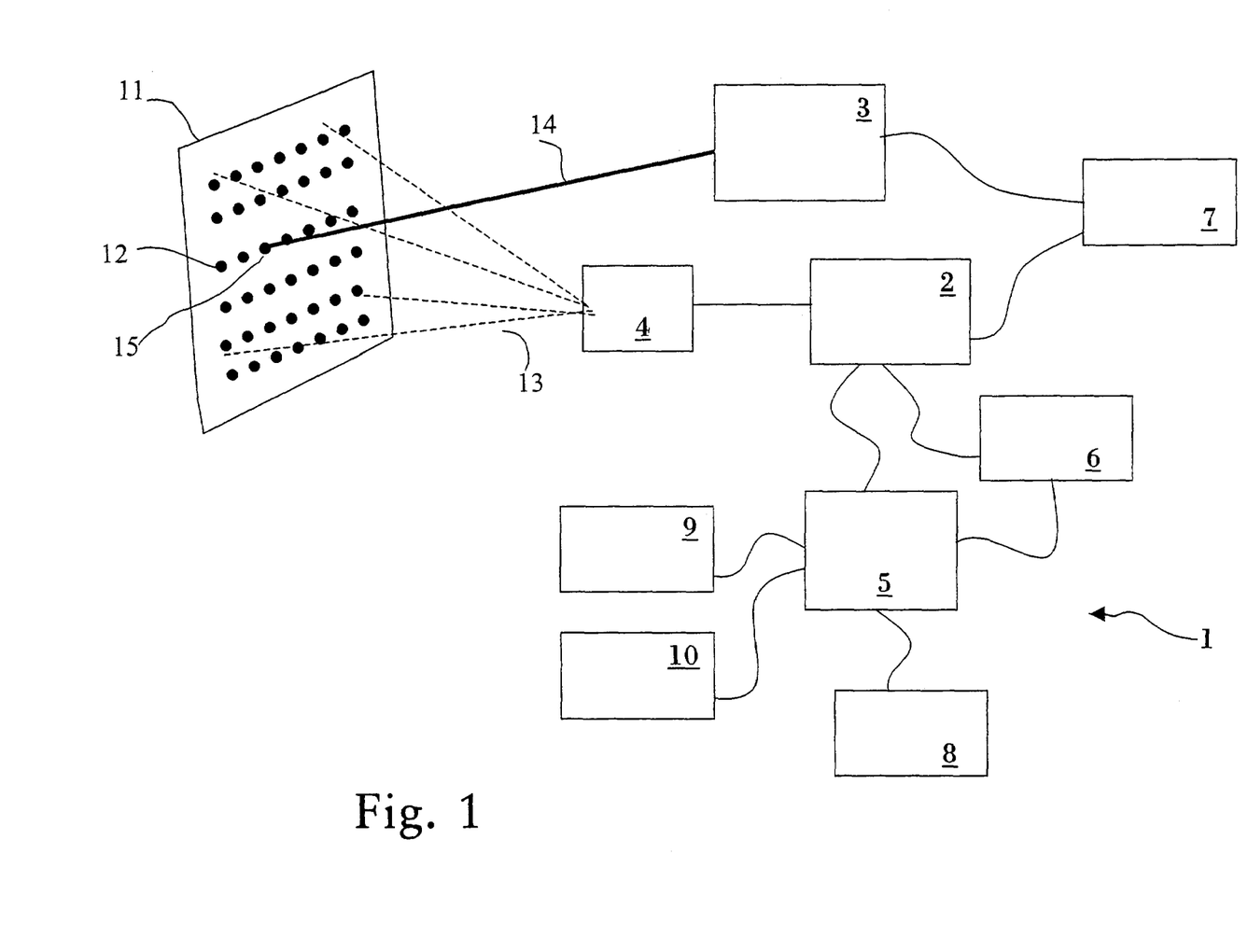
FIG. 1 is a schematic diagram of an image capture device, embodying a preferred embodiment of the invention, and a document containing desired text.

An image capture device 1 including a digital camera apparatus is shown in FIG. 1. The device 1 comprises an image capture module 2 having an image sensor and interface apparatus, and projector apparatus in the form of a laser light pattern generator 3. An optical lens 4 is also provided for focussing an image for the image capture module 2, in the form of camera apparatus, for transforming an optical image into a digital image. The module 2 comprises at least an image sensor and readout circuitry, and optionally includes a viewfinder for capturing general images in a conventional manner. Clearly, the viewfinder is not essential for capture and OCR of text.

The device is provided with text selector apparatus, including an electronic data processor 5 and memory 6. The selector apparatus is operable to select a desired text portion from captured text. The processor 5 and memory 6 are connected to the image capture module 2 for respectively processing and storing image data captured by the module 2. The memory 6 comprises random access memory (RAM) for storing image and operating data, and optionally read only memory (ROM) for storing machine readable program instructions, including OCR, best-fit algorithm and text structure recognition programs, and instructions for causing the processor to effect various operating modes of the device 1, as described in more detail below. It will be apparent to those skilled in the art that the program instructions can be stored in any convenient alternative type of memory device, for example RAM or ROM in the memory 6 or in the processor 5, in the form of software, firmware or hardware.

The text selector apparatus of the device 1 also includes actuating apparatus in the form of a multi-stage actuating button 7 for actuating a camera shutter of the image capture module 2 and also for actuating the light pattern generator 3. In a modification of the device 1, the actuating apparatus can take any other suitable form, for example a plurality of actuating buttons can be provided, or alternatively one single stage button. For example, where a single stage button is employed the generator 3 can be activated by rapid double pressing of the button, capture can be started by pressing the button again and capture could finish, and the generator be deactivated, on release of the button.

Further control of the generator 3 can be applied by program instructions and/or a tilt sensor to prevent operation of the laser in unsafe circumstances, for example as described in GB-A-2359895.

An input device 8 is connected to the processor 5 for inputting commands to the processor 5 for causing desired program instructions to execute. The input device 8 includes a user interface, implemented in hardware and/or software, for enabling a user to select a desired below-described operating mode of the device. The interface can include a keyboard for ease of operator input. Where only one operating mode is provided, it may not be necessary to provide the input device 8 for satisfactory operation. Speaker apparatus 9 is connected to the processor for deriving audible signals, and graphic display apparatus 10 is also connected to the processor for displaying OCR'd text.

The device 1 is shown as a stand alone device, but in a modified embodiment is provided as an integral part of a hand held device, for example a personal digital assistant (PDA) or pocket personal computer (PC) device. Alternatively, the device 1 is provided as an accessory connectable to such a hand held device, in which case the functions of some parts of the device 1 can be assumed by the hand held device. For example, the hand held device might provide the functions of at least one of the input device 8, speaker 9, and display 10, and can include additional memory and/or processing facilities.

In FIG. 1, the device 1 is shown as interacting with a text document 11 having thereon text indicated generally by reference sign 12. A field of view (capture field) of the device 1 through the lens 4 is shown in broken lines indicated generally by reference sign 13.

A first operating mode of the device 1, for digitally capturing desired text from a text document by manual scanning, will now be described with reference to FIGS. 1 to 4. The device 1 is placed in OCR mode using the input device 8, and the first operating mode is selected, also using the input device 8. The multi-stage actuating button 7 is depressed as far as a first stage, causing the generator 3 to project a laser beam 14 which casts a visible light image 15 on the document 11.

Figure 2:
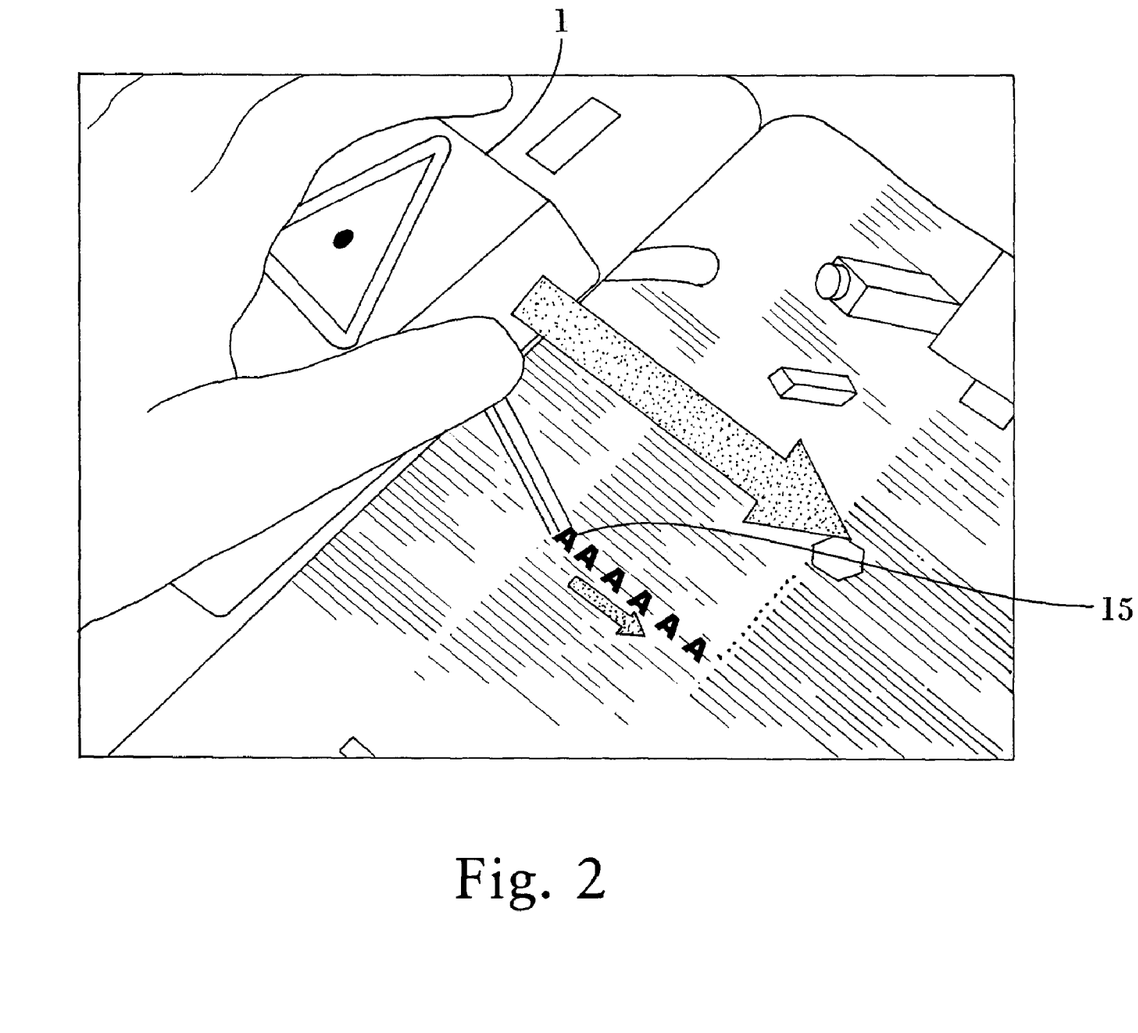
FIG. 2 is a photograph of the device of FIG. 1 in operation, projecting a visible light image onto a document.

Although not shown in the schematic FIG. 1, in the first operating mode the device 1 for convenience is arranged to project the light image 15 centrally of the field of view 13, substantially coaxially with the capture module's optical axis. However, this arrangement is not essential, and various alternative arrangements will be apparent to the skilled reader. As best seen in FIG. 2, the light image 15 is structured to form an image 15 representative of the present operating mode of the device 1. In this manual scanning mode, the image takes the form of an upper case letter A. A diffractive optics element (not shown) is included in the laser generator 3 for providing an image in the form of a text character to indicate that the device is presently in OCR mode.

Figure 3:
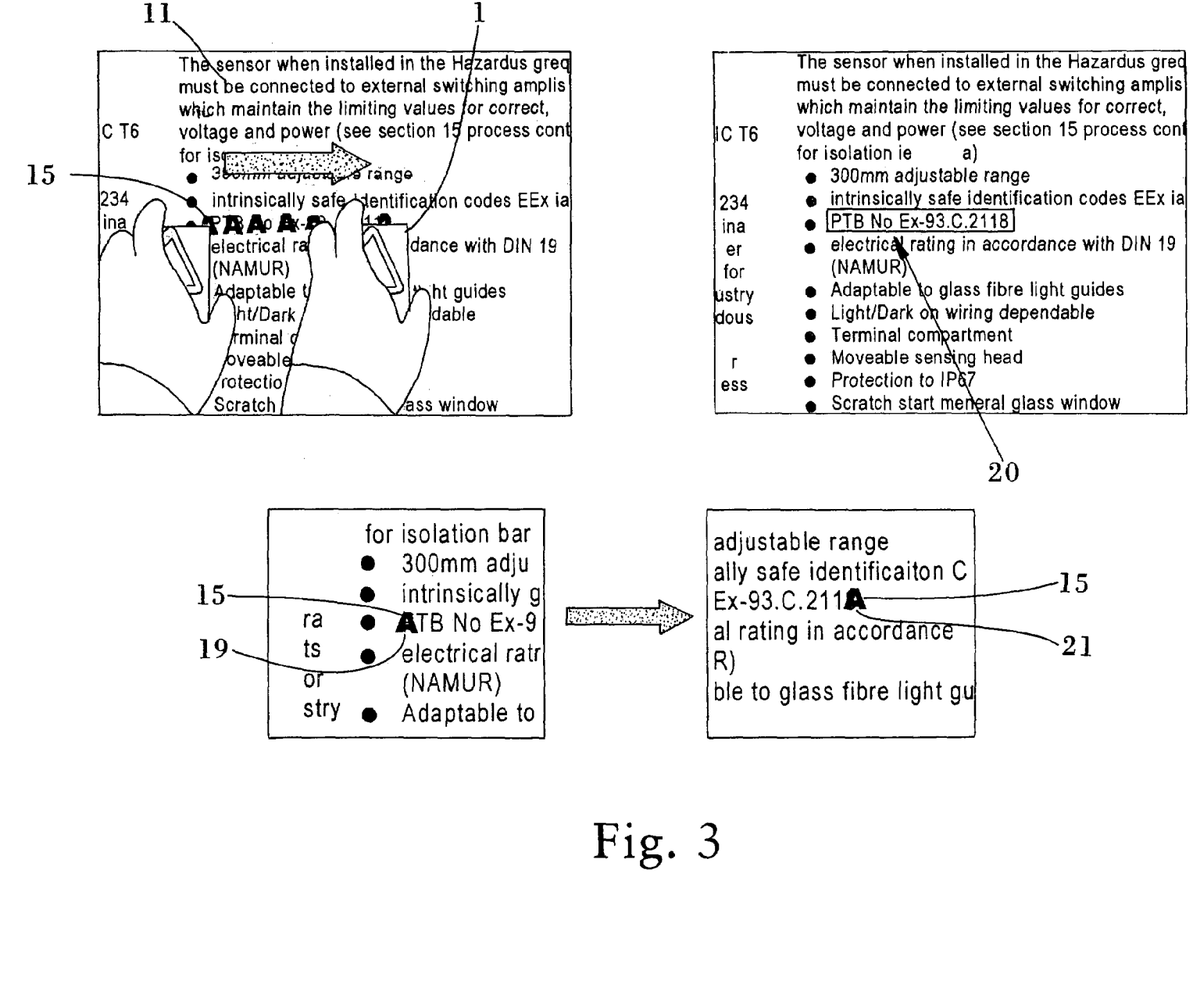
FIG. 3 is a photograph of the operation of FIG. 1 in manual scanning mode.

The user moves the hand-held device 1 so as to guide the image 15 to a desired location 19 in the text document 11, as shown in FIG. 3. In the example shown in FIG. 3, it is desired to capture a text portion in the form of a line of text 20. The user then depresses the actuating button 7 to a second stage, to thereby specify the location 19 to the device 1 as the starting point for manual scanning.

The user then moves the device 1 to guide the image 15 to a further desired location 21 so that the image passes over the desired text, thereby scanning the desired text. The user then releases the actuating button 7 to the first stage, thereby specifying the location 21 to the device as the finishing point for manual scanning, thereby ending the scanning. The user then releases the actuating button 7 to its starting position, thereby causing the generator to turn off the light image 15.

In this manner, the user can specify with precision the desired text he wishes to select for capture. A captured image corresponding to the selected text 20 is stored by the device 1 in memory 6 and can be displayed on the display 10 and edited if required.

Figure 4:
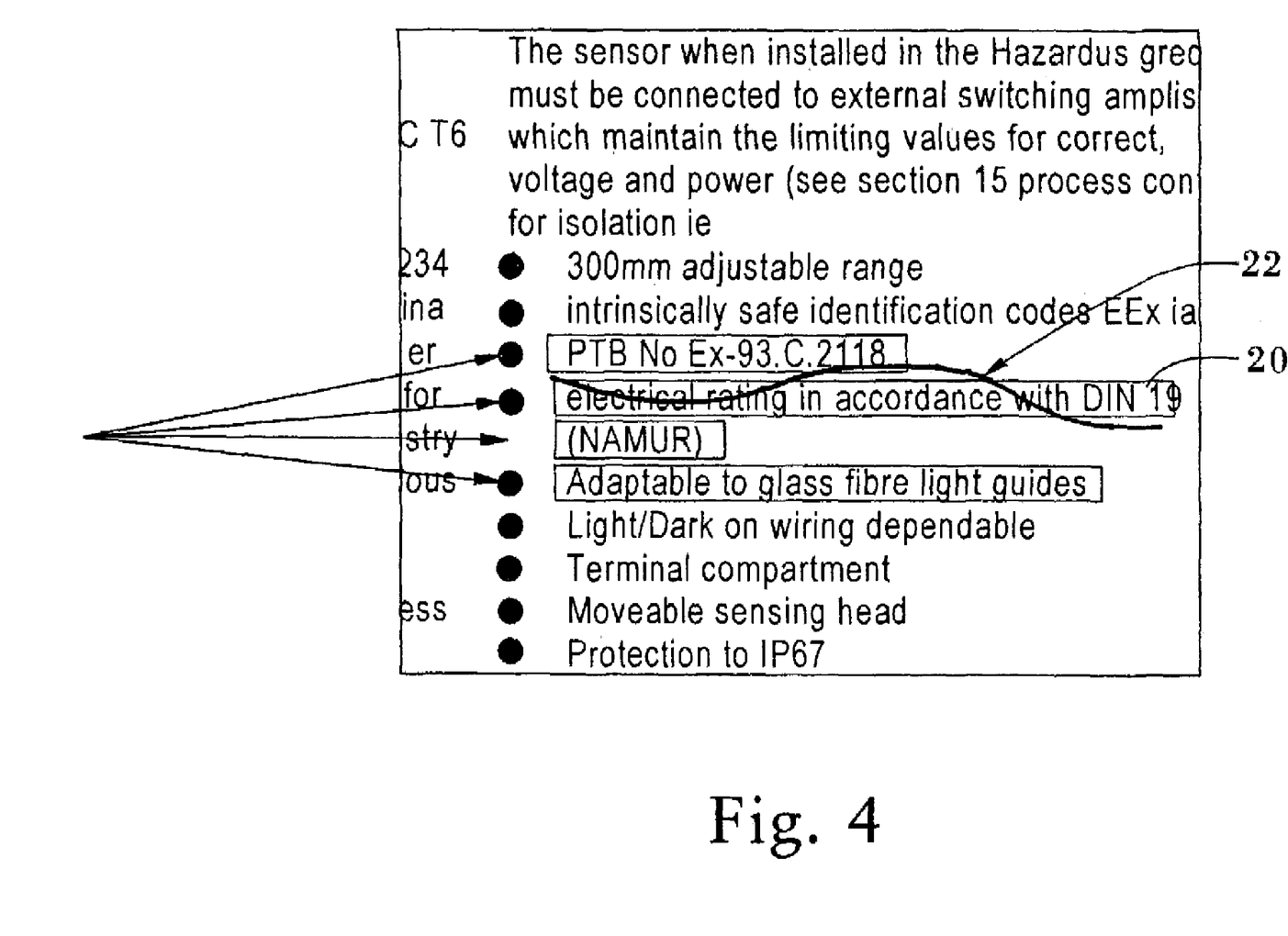
FIG. 4 is a photograph of an automatic best-fit operation performed by the device of FIG. 1.

As shown in FIG. 4, due to human error the path 22 of the image 15 may not exactly track the desired line 20 during manual scanning. Therefore, a best-fit operation is carried out by the processor 5 on the captured text data using the best-fit program instructions, to automatically select the best fitting line from mutually adjacent lines of text. The best-fit instructions can employ a voting system to determine the best fit, and may include an algorithm for detecting lines, for example as disclosed in Extraction of Illusory Linear Clues in Perspectively Skewed Documents, Maurizio Pilu, IEEE Computer Vision and Pattern Recognition Conference 2001. One or more frames can be captured while the laser beam is briefly switched off.

Other suitable methods for performing such operations, and determining quality of fit, are known in the art and will not be described in further detail. If the quality of fit is below a predetermined threshold, the device may be arranged to cause a warning signal to be given for the user's attention. For example, the signal could be an audible signal over the speaker 9 or a visual signal on the display 10.

The program instructions employ known image processing techniques to ensure that, if the extent of the desired text is greater than the extent of the capture field 13, two or more images are captured and linked automatically by the device. Using the manual scanning mode, multiple line capture can conveniently be carried out by scanning line by line in the manner described above. The device is adapted to derive an audible signal to indicate that a text structure has been successfully snapped, thus indicating a need to move to the next line.

A second operating mode, for snap capture of desired text, will now be described with reference to FIG. 5. Using the input device 8, the user places the device 1 in OCR mode and selects the second operating mode. The user identifies the structure of the desired text. For example, the desired text may be a word, line sentence or paragraph. The user then places the device in a corresponding text structure recognition mode, which will cause the device to search OCR'd text for text constituting the identified type of text structure.

Figure 5:
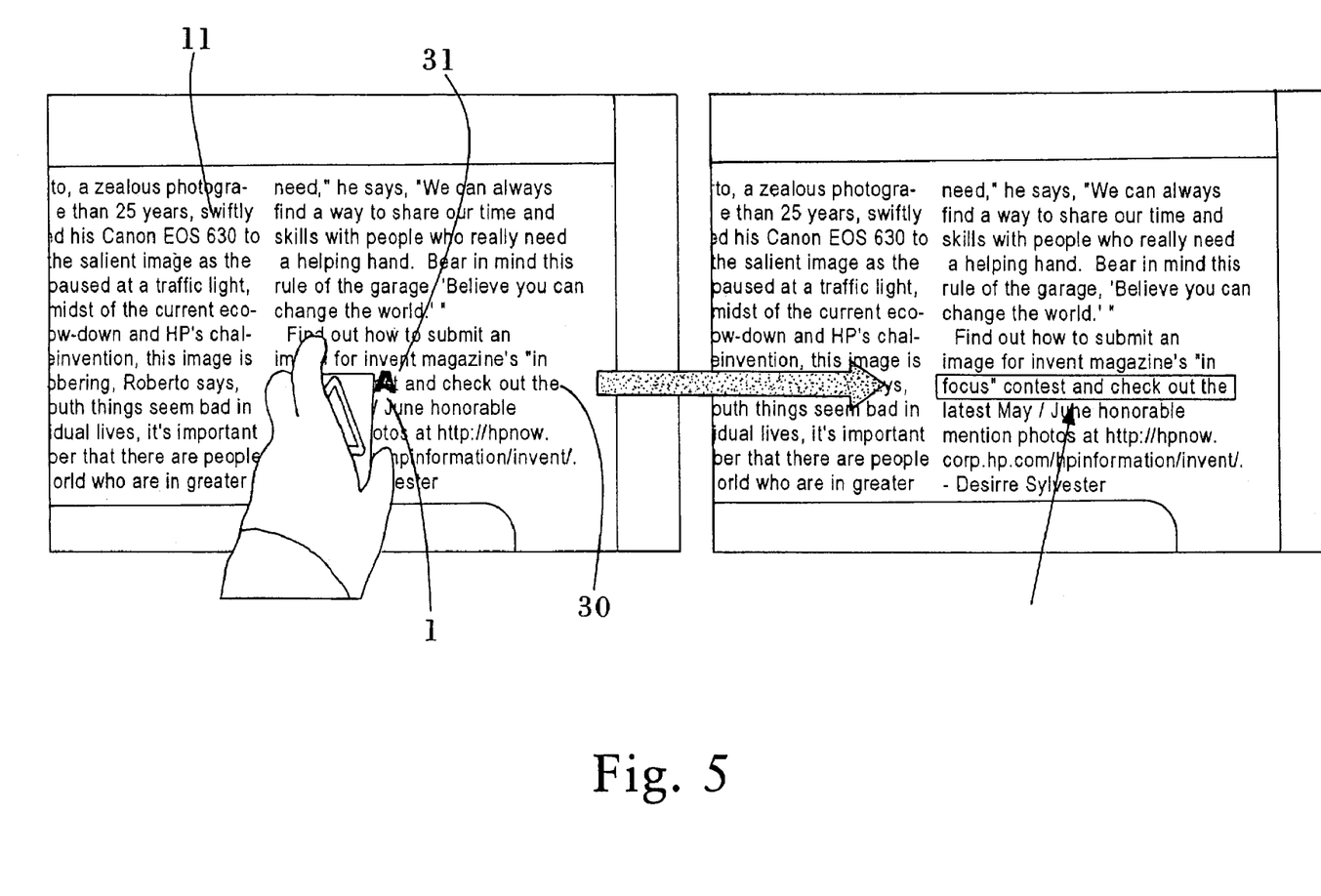
FIG. 5 is a photograph of operations of the device of FIG. 1 in a text structure recognition mode, wherein the device is operable to recognise a predefined text structure disposed at or adjacent a single specified location in a document.

In FIG. 5, the user wishes to select a line 30 of text, and thus places the device 1 in line recognition mode. The user depresses the actuating button 7 to the first stage, activating the laser beam 14. Whilst FIG. 5 shows the light image 15 in the form of an A, preferably a different form of projected image is used, indicative of the present operating mode and text structure recognition mode. For example, instead of the A, an A with a horizontal or diagonal line passing therethrough could be used.

The user guides the image 15 to a desired location 31 in the document 11 so as to fall on part of the desired line 30, preferably centrally of the line 30. The actuating button 7 is the depressed to the second stage, thereby causing the device to perform OCR and line recognition on the text line 30 at the single specified location 31 in an automatic capture operation. The device 1 then selects the recognised text line 30 and stores the text in memory 6. Multiple line capture can conveniently be carried out line by line. The device is adapted to give out an audible signal to indicate that a text structure has been successfully snapped, thus indicating a need to move to the next line.

Alternative types of text structure, for example words, sentences and paragraphs, can be selected in similar fashion using respective alternative text structure recognition modes. The device 1 is arranged to derive a warning signal, for example an audible or visible signal, when it is unable to recognise a complete predefined text structure in the OCR'd text, as described in greater detail below.

Figure 6:
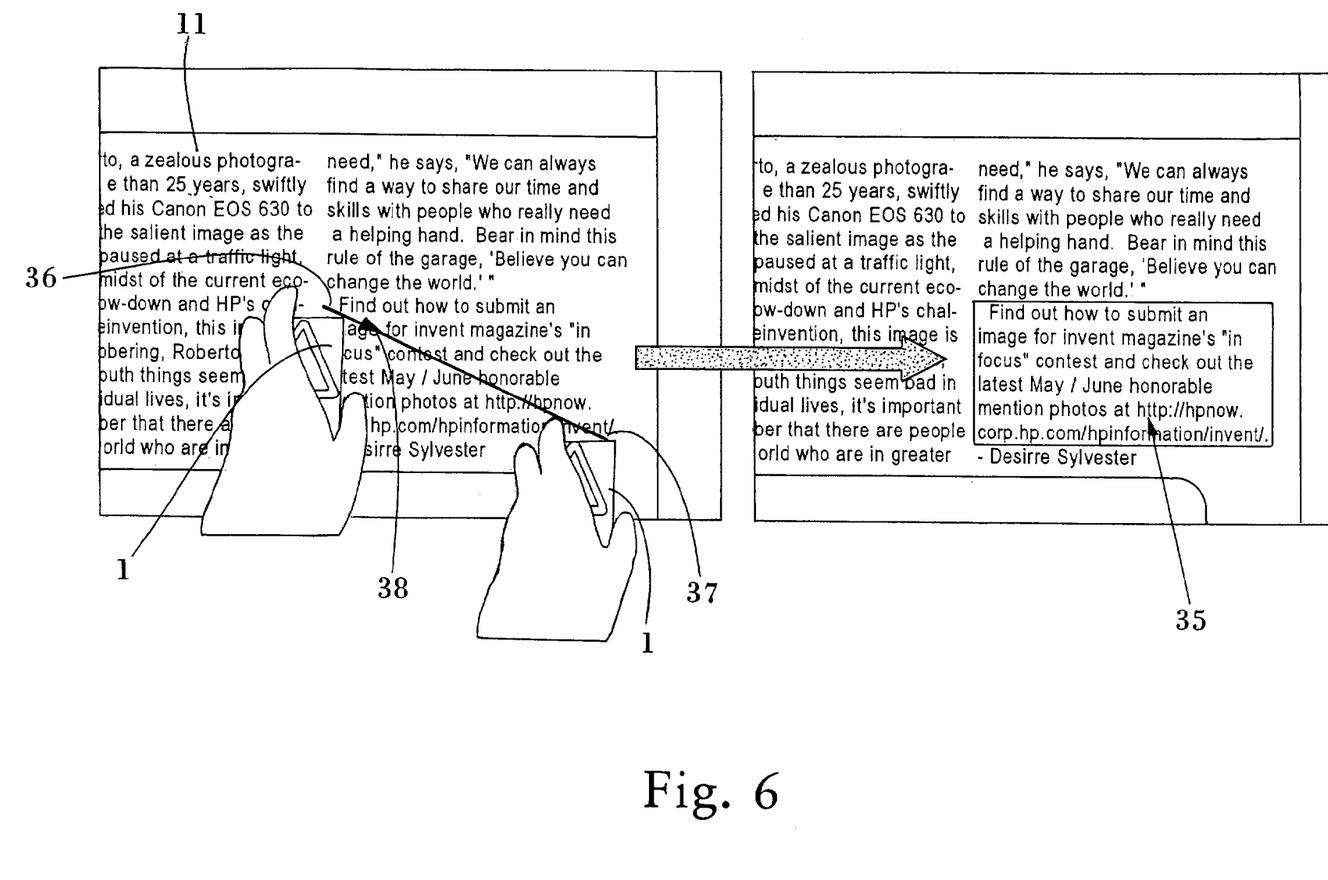
FIG. 6 is a photograph of the operation of the device of FIG. 1 in strike-through mode.

A further operating mode, for strike-through scanning of a desired text structure, is now described with reference to FIG. 6. In FIG. 6, the user desires to select text constituting a paragraph 35. Using the input device 8, he places the device 1 in strike-through mode and selects paragraph recognition mode. Having moved the actuating button 7 to the first stage to activate the laser beam 14, the user guides the light image 15 to fall at a desired location 36 adjacent a corner of the paragraph 35. The image 15 indicates the presently selected operating mode and text structure recognition mode.

The user then depresses the button 7 and holds it in the second stage whilst he moves the device 1 diagonally across the paragraph in the direction of arrow 38 to cause the image 15 to move to a further desired location 37, thereby striking through the paragraph structure with the path of the image 15, and causing the device to scan text in the region of the paragraph.

The user then releases the button 7 to the first stage, so as to cause the device to stop scanning. The device carries out text structure recognition processing on the scanned and OCR'd text so as to select the recognised text constituting the paragraph 35 for storage in the memory 6.

Tests are executed to test for integrity of the text structure, as described in greater detail below. If no complete paragraph structure can be identified, the device causes a warning to be given. This is particularly useful in the event opposite corners of the paragraph structure cannot be accommodated in the capture field of the device. In this case, another method of capture will be required. Clearly, the strike through method can be used with other suitable text structure recognition modes if desired, for recognising, for example, columnar, tabular or multiple paragraph structures.

Figure 7:
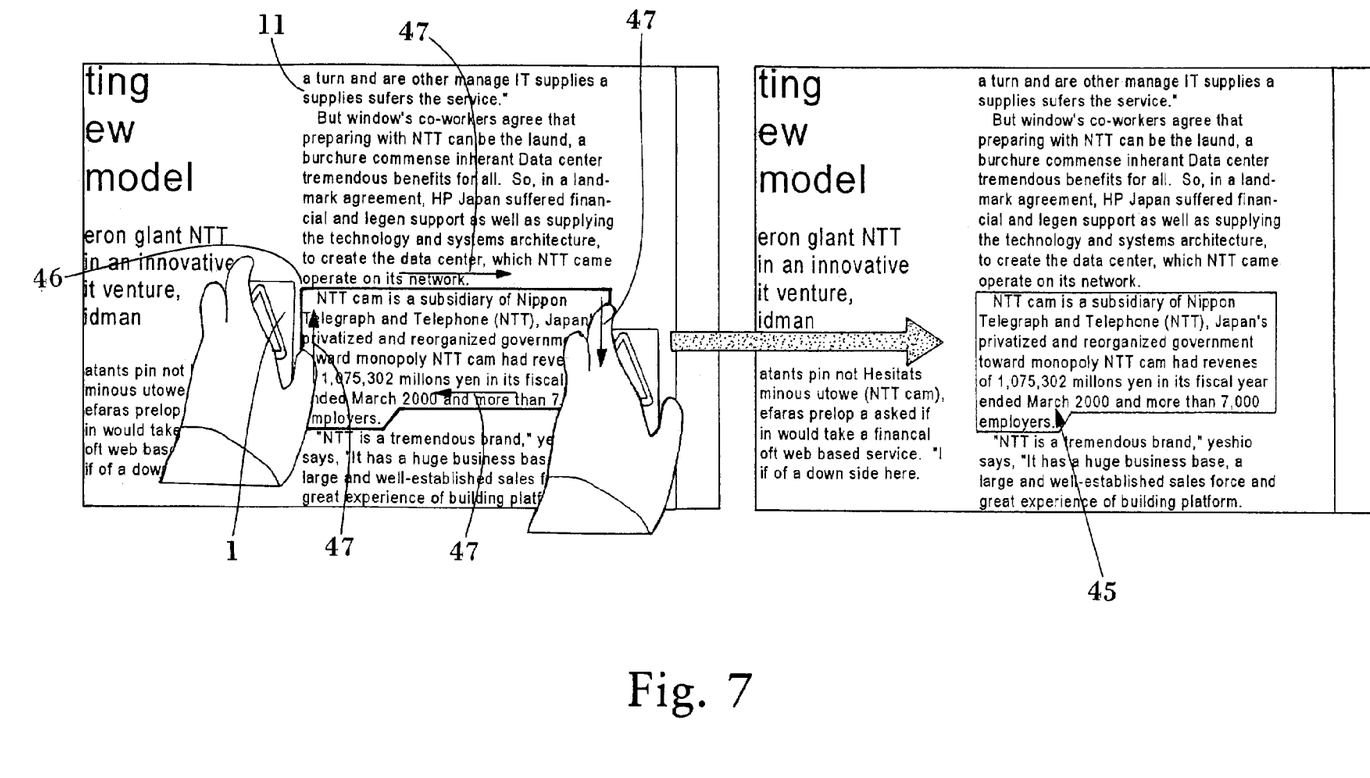
FIG. 7 is a photograph of the operation of the device of FIG. 1 in outline scanning mode.

A still further operating mode, for outline scanning of a desired text structure, will now be described with reference to FIG. 7. A user desires to select text constituting a paragraph 45. Using the input device 8, he places the device 1 in outline mode and selects paragraph recognition mode. Having moved the actuating button 7 to the first stage to activate the laser beam 14, the user guides the light image 15 to fall at a desired location 46 adjacent a corner of the paragraph 45. As before, the image 15 is indicative of the presently selected operating mode.

He then depresses the button 7 and holds it in the second stage whilst he guides the image 15 generally around the periphery of the paragraph in the direction of arrows 47 and back to the location 46, thereby outlining the paragraph structure with the path of the image 15, and causing the device to scan text in the region of the paragraph.

The user then releases the button 7 to the first stage, so as to cause the device to stop scanning. The device carries out text structure recognition processing on the scanned and OCR'd text so as to select the recognised text constituting the paragraph 45 for storage in the memory 6.

If no complete paragraph structure can be identified, the device causes a warning to be given. This is particularly useful in the event the entire paragraph structure cannot be accommodated in the capture field of the device by moving around the paragraph outline, which may cause central portions of the paragraph to be omitted. Clearly, the outline method can be used with other suitable text structure recognition modes if desired.

For recognising whether a text structure, for example a paragraph structure, is complete, the text structure recognition software of the device 1 causes the processor to effect tests for interruption of an OCR'd text structure. The tests for interruption may be based on at least one of: lexical analysis of the captured text structure; detection of broken words at the edges of the structure; and outline analysis of the structure. Suitable techniques are disclosed, for example, in H. S. Baird, Background Structure in Document Images, International Journal of Pattern Recognition and Artificial Intelligence, 8(5):1013–1030, 1994. Also, a gap in coverage may be detected by a geometric method, through analysis of the motion of the light image 15 on the document 11 and the field of view of the image capture module 2, so as to determine, for example, an omitted central portion of a paragraph captured using the outline method.

The warning of failure of the device to recognise a complete text structure, i.e. non-recognition of a text structure or detection of an interrupted text structure, is an audible signal given over the speaker 9, but alternatively or additionally could be visual signal on the display, or another type of signal. On receipt of the warning, the user has an opportunity to repeat the capture process or try another method of capture.

In a modified device 1, other variations in the projected image 15 than variations in its form can be used to distinguish between any one of the above-mentioned present operating modes and another. For example, the image might flash with a particular frequency, or the brightness of the image might vary. Such variations can also be used to indicate a present state of the device, for example when the device is in the initial pointing stage, when processing is in progress etc.

The best-fit program mentioned above can be employed in conjunction with the strike-through and outline modes if desired.

It will be apparent to those of ordinary skill in the art that the light pattern generator could alternatively be a collimated LED device or any other suitable form of light source. Also, whilst various interconnections are shown for convenience between the parts of the device 1 shown in FIG. 1, it will be apparent to those of ordinary skill in the art that the precise arrangement of these physical interconnections can be varied as desired to achieve the functionality described above.

In a modified embodiment, the device 1 provides a more limited selection of OCR operating modes. For example, only one operating mode might be provided, for example the first operating mode only. Where it is not desired or necessary to distinguish one operating mode from another, the projected light image 15 could simply be a dot or another unstructured light form.

The device may be further operable to capture and store, during scanning, multiple images from the document 11 and to process these images to improve the quality of the captured text image in accordance with a method such as that disclosed in M Irani and S Peleg, Improving Resolution by Image Registration, Computer Vision Graphics and Image Processing Journal, volume 53, pages 231 to 239, May 1991.

The invention claimed is:

1. An image capture device for capturing and selecting a desired portion of text, said device comprising: projector apparatus adapted to project a visible guiding light image onto text on a document to enable a user of the device to position the visible guiding light image relative to the desired text portion; capture apparatus adapted to capture at least some of said text based on a user responding to the position of the visible guiding light image; and text selector apparatus adapted to select said desired text portion from the captured text.

2. An image capture device as claimed in claim 1, wherein the device is adapted to capture text over-passed by the visible guiding light image as the visible guiding light image moves between two locations in the document, said locations defining opposite ends of said desired text portion.

3. An image capture device as claimed in claim 2, wherein the device is adapted to perform optical character recognition on the text over-passed by the visible guiding light image.

4. An image capture device as claimed in claim 2, wherein the selector apparatus is adapted to automatically perform a best-fit operation on the text over-passed by the visible guiding light image so as to distinguish a desired said text portion disposed between two said locations on a line of text from text disposed on at least one adjacent, parallel, line of text.

5. An image capture device as claimed in claim 1, wherein the selector apparatus is adapted to recognise a said desired text portion having a predefined text structure.

6. An image capture device as claimed in claim 5, wherein the predefined text structure is at least one of: a word, a line, a sentence and a paragraph.

7. An image capture device as claimed in claim 5, wherein the selector apparatus is adapted to recognise a said predefined text structure disposed at or adjacent a location in the document identified by a position of the visible guiding light image.

8. An image capture device as claimed in claim 5, wherein the device is adapted to perform in response to a single actuating action, capture, optical character recognition, and recognition of a said predefined text structure.

9. An image capture device as claimed in claim 5, wherein the device is arranged to perform recognition of a said predefined text structure identified by moving the visible guiding light image so as to at least partially, substantially diagonally, strike-through the desired text portion.

10. An image capture device as claimed in claim 5, wherein the device is arranged to perform recognition of a said predefined text structure identified by moving the visible guiding light image at least partially around a periphery of a desired text portion, so as to substantially outline the desired text portion.

11. An image capture device as claimed in any claim 1, wherein the device is adapted to project the visible guiding light image in a form or manner indicative of a present operating mode of the device.

12. An image capture device as claimed in claim 11, wherein the device is adapted to vary a flash frequency or brightness of the visible guiding light image to distinguish between different operating modes of the device.

13. An image capture device as claimed in claim 1, wherein the selector apparatus comprises user-operable actuating apparatus having: a) a first stage adapted to start and stop projection of the visible guiding light image; and b) a further stage adapted to start and stop image capture.

14. An image capture device as claimed in claim 13, wherein the actuating apparatus comprises a single two stage actuator.

15. An image capture device as claimed in claim 13, wherein the device is arranged so initiation of said further stage causes execution of an automatic capture operation.

16. An image capture device as claimed in claim 13, wherein the further stage is manually operable to start, and subsequently to stop, scanning.

17. An image capture device as claimed in claim 5, wherein the device is adapted to give a warning signal when it is unable to recognise a complete said predefined text structure in text captured by the device.

18. A method of selecting and capturing in electronic form a desired multi-letter portion of text from a text document, the method comprising:
   a) guiding a projected light image relative to the desired multi-letter text portion;
   b) capturing text in a region in response to the position of the guided projected image; and
   c) processing the captured text so the desired multi-letter text portion is selected from the captured text.

19. A method as claimed in claim 18, wherein the text capturing step is performed by guiding the image over the desired text portion.

20. A method as claimed in claim 18, wherein: the text capturing step is performed with the image positioned at one location in the document; and further comprising processing the captured text to perform recognition of a predefined text structure disposed at said location, said text structure comprising a word, line, sentence or paragraph structure corresponding to the desired text portion.

21. A method as claimed in claim 18, wherein: the text capturing step is performed by moving the image around or across a desired paragraph; and further comprising processing the captured text to perform recognition of a predefined text structure comprising a paragraph structure.

22. A method as claimed in claim 18, further comprising performing a best-fit operation to fit captured text to a predefined text structure in accordance with a present operating mode of the device.

23. A method as claimed in claim 18, further comprising automatically switching oft the projected light image immediately prior to capturing the text.

24. Camera means for digitally capturing text, comprising:
   a) means for projecting structured visible radiation to at least one specified location in a text document and for guiding a text capture field of the camera means, the guided text capture field including the at least one specified location, the projected structured visible radiation enabling a user of the camera means to select the guided text capture field, and
   b) optical character recognition (OCR) means adapted to be responsive to a user input indicative of the captured guided text capture field for performing OCR on text in the guided text capture field captured by said means for projecting and guiding.

25. Camera means as claimed in claim 24, further comprising text structure recognition means for recognising a predefined text structure in the OCR'd text.

26. The image capture device of claim 1 wherein the projector apparatus is arranged so that the visible guiding light image is focused on the desired portion of text while the projector apparatus is at a position remote enough from the text document so text on the document can be seen directly by a user of the image capture device including the projector apparatus.

27. The method of claim 18 further including holding a source of the projected light image at a position remote enough from the text document so text on the document is seen directly by a user on the source; step a) being performed while the source is at the remote position from the text of document and the user is looking at (i) the text on the document and (ii) the light image, as projected on the text.

28. The camera means of claim 24 wherein the means for projecting is arranged so that a visible light image projected by the means for projecting is adapted to be focused on a desired portion of text so while the camera means including the means for projecting is at a position remote enough from the text so text can be seen directly by a user of the camera means.

* * * * *